(12) United States Patent
Kabra et al.

(10) Patent No.: US 11,537,915 B2
(45) Date of Patent: Dec. 27, 2022

(54) TARGETED DATA ACQUISITION FOR MODEL TRAINING

(71) Applicant: INTERNATIONAL BUSINESS MACHINES CORPORATION, Armonk, NY (US)

(72) Inventors: Namit Kabra, Hyderabad (IN); Ritesh Kumar Gupta, Hyderabad (IN); Vijay Ekambaram, Chennai (IN); Smitkumar Narotambhai Marvaniya, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 394 days.

(21) Appl. No.: 16/874,531

(22) Filed: May 14, 2020

(65) Prior Publication Data

US 2021/0357779 A1 Nov. 18, 2021

(51) Int. Cl.
*G06F 15/16* (2006.01)
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC ................................. G06N 5/04; G06N 20/00
USPC ........................................................ 709/200
See application file for complete search history.

(56) References Cited

U.S. PATENT DOCUMENTS

| 7,792,770 B1* | 9/2010 | Phoha ................. G06K 9/6284 |
| | | 706/45 |
| 9,349,105 B2 | 5/2016 | Beymer et al. |
| 10,177,998 B2* | 1/2019 | Parandehgheibi .... G06F 21/556 |
| 10,229,171 B2 | 3/2019 | Ekambaram et al. |

(Continued)

FOREIGN PATENT DOCUMENTS

| WO | 2016012868 A1 | 1/2016 |
| WO | 2017151759 A1 | 9/2017 |

OTHER PUBLICATIONS

Miech, A., et al., "Learning a Text-Video Embedding from Incomplete and Heterogeneous Data", Computer Vision and Pattern Recognition, vol. abs/1804.02516, Apr. 2018, 17 pgs.

(Continued)

*Primary Examiner* — Moustafa M Meky
(74) *Attorney, Agent, or Firm* — Rakesh Roy; Matthew M. Hulihan; Heslin Rothenberg Farley & Mesiti PC

(57) ABSTRACT

Targeted acquisition of data for model training includes automatically generating metadata describing samples, of an initial dataset, in neighborhoods of an embedding space in which the samples are embedded. The samples described by the automatically generated metadata are classified by a classification model, and include both correctly classified samples in the neighborhoods and incorrectly classified samples in the neighborhoods. Additionally, attributes of one or more correctly classified samples of the collection of samples and one or more incorrectly classified samples of the collection of samples are identified, and queries are generated based on the identified attributes, the queries tailored, based on the attributes, to retrieve additional training data for training the classification model to more accurately classify samples and avoid incorrect sample classification.

25 Claims, 7 Drawing Sheets

(56) References Cited

U.S. PATENT DOCUMENTS

| | | | |
|---|---|---|---|
| 10,409,789 B2 | 9/2019 | Zoll et al. | |
| 10,728,119 B2* | 7/2020 | Parandehgheibi | G06F 21/566 |
| 11,151,179 B2* | 10/2021 | Li | G06F 16/335 |
| 11,176,589 B2* | 11/2021 | Pyati | G06N 20/00 |
| 2009/0222389 A1* | 9/2009 | Hido | G06N 20/10 |
| | | | 706/46 |
| 2015/0301795 A1 | 10/2015 | LeBrun | |
| 2016/0359740 A1* | 12/2016 | Parandehgheibi | H04L 43/0876 |
| 2018/0075359 A1 | 3/2018 | Brennan et al. | |
| 2018/0210955 A1 | 7/2018 | Crabtree et al. | |
| 2019/0121350 A1 | 4/2019 | Cella et al. | |
| 2019/0306035 A1* | 10/2019 | Scheib | H04L 63/1441 |
| 2019/0311301 A1* | 10/2019 | Pyati | G06F 16/901 |
| 2020/0004766 A1* | 1/2020 | Li | G06F 40/30 |
| 2021/0248503 A1* | 8/2021 | Hickey | G06V 40/10 |

OTHER PUBLICATIONS

Mell, P., et al., "The NIST Definition of Cloud Computing", NIST Special Publication 800-145, Sep. 2011, Gaithersburg, MD, 7 pgs.

Albertson, M., "IBM wants to improve use and delivery of AI services through DataOps", retrieved on Mar. 17, 2020 from the Internet URL: <https://siliconangle.com/2019/10/22/IBM-wants-to-improve-use-and-delivery-of-ai-services-through-dataops-dataaiforum/>, the Cube, Oct. 22, 2019, 7 pgs.

Xu, A., "Improving Classification Accuracy using Data Augmentation & Segmentation: A hybrid implementation in Keras & Tensorflow using Transfer Learning", retrieved on Mar. 17, 2020 from the Internet URL: <https://medium.com/gradientcrescent/improvingclassification-accuracy-using-data-augmentationsegmentation-a-hybrid-implementation-8ec29fa97043>, Gradientcrescent, Jun. 23, 2019, 11 pgs.

Mnasri, M., "Text augmentation for Machine Learning tasks: How to grow your text dataset for classification?", retrieved on Mar. 17, 2020 from the Internet URL: <https://medium.com/opla/text-augmentation-formachine-learning-tasks-how-to-grow-your-text-datasetfor-classification-38a9a207f88d>, Jan. 18, 2019, 8 pgs.

Shorten, C., "Hacking your Image Recognition Model", retrieved on Mar. 17, 2020 from the Internet URL: <https://towardsdatascience.com/hacking-your-image-recognition-model-909ad4176247>, Aug. 30, 2018, 4 pgs.

Noy, N., "Google dataset search", retrieved on Mar. 17, 2020 from the Internet URL: <https://www.blog.google/products/search/making-it-easier-discover-datasets/>, Google—The Keyword, Sep. 5, 2018, 3 pgs.

Gao, Y., et al., "Navigating the data lake with DATAMARAN: automatically extracting structure from log datasets", SIGMOD'18, Jun. 10-15, 2018, 20 pgs.

Xiao, T., et al., "Learning from Massive Noisy Labeled Data for Image Classification", CVPR 2015, pp. 2691-2699.

Roh, Y., et al., "A Survey on Data Collection for Machine Learning", retrieved on Mar. 27, 2020 from the Internet URL: <https://arxiv.org/pdf/1811.03402 pdf >, Aug. 12, 2019, 20 pgs.

Dehamecha, T., et al., "Between-Subclass Piece-wise Linear Solutions in Large Scale Kernel SVM Learning", retrieved on Mar. 27, 2020 from the Internet URL: <http://iab-rubric.org/papers/2019_PR_SVM.pdf>, Mar. 18, 2019, 38 pgs.

\* cited by examiner

TARGETED DATA ACQUISITION FOR MODEL TRAINING

BACKGROUND

Aspects described herein relate to the field of data operations ("DataOps") and more particularly to targeted data acquisition for classification model training. DataOps is the orchestration of people, processes, and technology to rapidly deliver trusted, business-ready data to data citizens, operations, applications and artificial intelligence (AI). It often integrates development operations ("DevOps"), data management and data governance into a common framework, with a collaborative way of developing and maintaining data flows across stakeholders. It is commonly designed to solve challenges associated with inefficiencies in accessing, preparing, integrating, and making data available to consumers, such as a business unit, an analytics team, or an operational process.

A benefit of quality DataOps is productivity gain in delivering required information and data in a highly efficient and optimized way. Organizations can drive data projects into production and benefit from continuous integration and delivery (CI/CD), delivering sustainable and incremental improvements when high-quality data is rapidly identified and utilized. An example of this is in constructing, building, and training classification models.

Lack of quality data, inefficient and time-consuming processes associated with data collection and data preparation, and silo'd organizations and data ownership can be major obstacles to realizing the most benefit from data-related projects. Meanwhile, knowledge workers spend significant amounts of time searching for information to perform their jobs, and much of the information that may be returned in the form of search results may not be useful.

Typically in machine learning (ML), deep learning (DL), and other artificial intelligence applications, a dataset is used to build and train model that can be used for solving specific task(s), such as image classification, text classification, sentence similarity determination, natural language processing, and other tasks. Sometimes a model performs very well with given data points (samples) but does not perform well with other data points. Additionally or alternatively, some models may perform very well with some data points that other models do not perform well with.

One approach is to provide the largest practical training dataset so that a model captures as many characteristics of data as possible. The goal in that approach is for the model to learn by flooding it with as much data as possible. Humans are typically relied on to identify whether a model is not performing well and attempt to address deficiencies by providing other, or additional, training data. However, this can be burdensome and many times unproductive.

SUMMARY

Auto-population of datasets with quality data, particularly in the machine learning space, may be desired. Accordingly, described herein are aspects directed to preparing, assessing, identifying and obtaining proper datasets for classification models and artificial intelligence (AI) dashboards.

Shortcomings of the prior art are overcome and additional advantages are provided through the provision of a computer-implemented method. The method automatically generates metadata describing samples, of an initial dataset, in neighborhoods of an embedding space in which the samples are embedded. The samples described by the automatically generated metadata are classified by a classification model, and include both correctly classified samples in the neighborhoods and incorrectly classified samples in the neighborhoods. The method also identifies attributes of one or more correctly classified samples of the collection of samples and one or more incorrectly classified samples of the collection of samples, and generates queries based on the identified attributes. The queries are tailored, based on the attributes, to retrieve additional training data for training the classification model to more accurately classify samples and avoid incorrect sample classification.

Further, a computer system is provided that includes a memory and a processor in communication with the memory, wherein the computer system is configured to perform a method. The method automatically generates metadata describing samples, of an initial dataset, in neighborhoods of an embedding space in which the samples are embedded. The samples described by the automatically generated metadata are classified by a classification model, and include both correctly classified samples in the neighborhoods and incorrectly classified samples in the neighborhoods. The method also identifies attributes of one or more correctly classified samples of the collection of samples and one or more incorrectly classified samples of the collection of samples, and generates queries based on the identified attributes. The queries are tailored, based on the attributes, to retrieve additional training data for training the classification model to more accurately classify samples and avoid incorrect sample classification.

Yet further, a computer program product including a computer readable storage medium readable by a processing circuit and storing instructions for execution by the processing circuit is provided for performing a method. The method automatically generates metadata describing samples, of an initial dataset, in neighborhoods of an embedding space in which the samples are embedded. The samples described by the automatically generated metadata are classified by a classification model, and include both correctly classified samples in the neighborhoods and incorrectly classified samples in the neighborhoods. The method also identifies attributes of one or more correctly classified samples of the collection of samples and one or more incorrectly classified samples of the collection of samples, and generates queries based on the identified attributes. The queries are tailored, based on the attributes, to retrieve additional training data for training the classification model to more accurately classify samples and avoid incorrect sample classification.

In some embodiments, a method additionally includes obtaining an embedding of a collection of samples, of the initial dataset, in the embedding space, the embedding presenting a respective classification of each sample of the collection of samples by the classification model, and defining the neighborhoods of the embedding space. Each neighborhood of the neighborhoods can include a respective (i) at least one incorrectly classified sample of the collection of samples, embedded in the embedding space, that the classification model incorrectly classified and (ii) a respective at least one correctly classified sample of the collection of samples, embedded in the embedding space, that the classification model correctly classified. The samples described by the automatically generated metadata can be samples in those defined neighborhoods.

Additionally or alternatively, in some embodiments a method further includes constructing, using the automatically generated metadata, knowledge graphs that inform the identified attributes of the one or more correctly classified samples of the collection of samples and the one or more incorrectly classified samples of the collection of samples.

Advantages of the foregoing include the automatic identification of the kind of data sources, and specific data, to be added for training a model in order for the model to learn critical characteristics in samples, and provide targeted improvement in the model. This includes identification of important characteristics to capture in additional training data in order to ensure that the model is being effectively trained to address identified issues in the model improperly classifying data samples. Further advantages include identifying characteristics of additional samples to seek out and provide for training the model so that the model can better understand 'hyperplane' boundaries between model classes. This can advantageously help eliminate data quality issues and thereby improve model performance.

Additional features and advantages are realized through concepts described herein.

In some embodiments, defining the neighborhoods includes using at least one radius to define a region of the embedding space centered around an incorrectly classified sample. The region defines a neighborhood of the neighborhoods, and any samples within the region are samples within that neighborhood. An advantage of a radius-based approach to neighborhood definition is used is that it enables convenient, selective tailoring of neighborhood size to capture an appropriate number of samples to define a targeted region of the embedding space that is presenting problems for the model in terms of properly classifying samples of that targeted region. Too large a region can present problems in terms of too large a number of characteristics that could be affecting model performance of the region (and therefore targeting specific data samples to improve the model), while too small a region can present problems in terms of identifying specific characteristics to target in samples to improve the model.

In some embodiments, the collection of samples can include images and/or text, and the automatically generated metadata includes (i) caption information of the images and/or (ii) object, subject, and relationship information of the text. An advantage provided is that these forms of metadata enable efficient identification of additional samples to target model improvement.

In some embodiments, the collection of samples can include images, and at least some of the informed attributes include an object depicted in at least some of the images. The automatically generated metadata can include visibility flags indicating whether the object is visible in the images, and the generating the queries can use the visibility flags in determining whether to tailor at least one query to include or omit results in which the object is visible. This has an advantage in that the visibility flags can provide straightforward search query parameterization for targeted searching of additional data samples.

In some embodiments, the automatically generating the metadata can include initially generating metadata for each neighborhood of the neighborhoods, and the constructing the knowledge graphs can include constructing a respective knowledge graph for each neighborhood of the neighborhoods based on the metadata generated for that neighborhood. Aspects can combine attributes informed by at least some of the constructed knowledge graphs to construct an aggregate knowledge graph, and generating the queries can generate at least one query of the generated queries from the aggregate knowledge graph. This has an advantage in that it can reduce the number of queries proposed to issue for additional searching while still targeting samples with characteristics most expected to improve the model, which reduction in the number of queries to issue leads to cost savings.

In some embodiments, the generated queries are implemented as crawl paths for crawling remote resources to retrieve the additional training data. Additionally or alternatively, at least some of the generated queries can be multimodal, which query for both text and image results. These aspects can have advantages in that more accurate results can be delivered when multiple modes are utilized, and crawl paths/crawling enable intermediate results and feedback to perform refined/follow-on searches to identify more appropriate and relevant samples.

In some embodiments, the generated queries are ranked into a ranked list of queries, and a query to issue is selected from the ranked list of queries. The selecting can apply a budget including constraint(s) on resources to execute the query. The resources can include computing cost, memory, time, and/or electrical power. This has an advantage in that it can reduce the number of queries and scope thereof according to budgetary considerations and therefore provide cost savings, while still targeting useful additional samples for improving the model.

In some embodiments at least one query of the generated queries is issued, in response to the issuing, additional samples on which to train the classification model are retrieved, and the classification model is retrained using the additional samples. This has an advantage in that the retrieval of effective additional samples and training of the model on those samples most effectively trains the model to address identified issues thereof in embedding regions that are deemed most problematic in terms of proper classification.

In some embodiments, based on the retraining, the (i) automatically generating metadata, (ii) identifying attributes, (iii) generating queries, (iv) issuing at least one query, (v) retrieving additional samples, and (vi) retraining the classification model are iterated one or more times, and a process checks whether to halt the iterating by testing stability of the classification model and determining whether a threshold has been reached to avoid overfitting the classification model. Iterating has an advantage in that the model may be continually improved, building on improvements of past iterations. An additional advantage is that the check to halt can help avoid overfitting the model and therefore degraded model performance.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
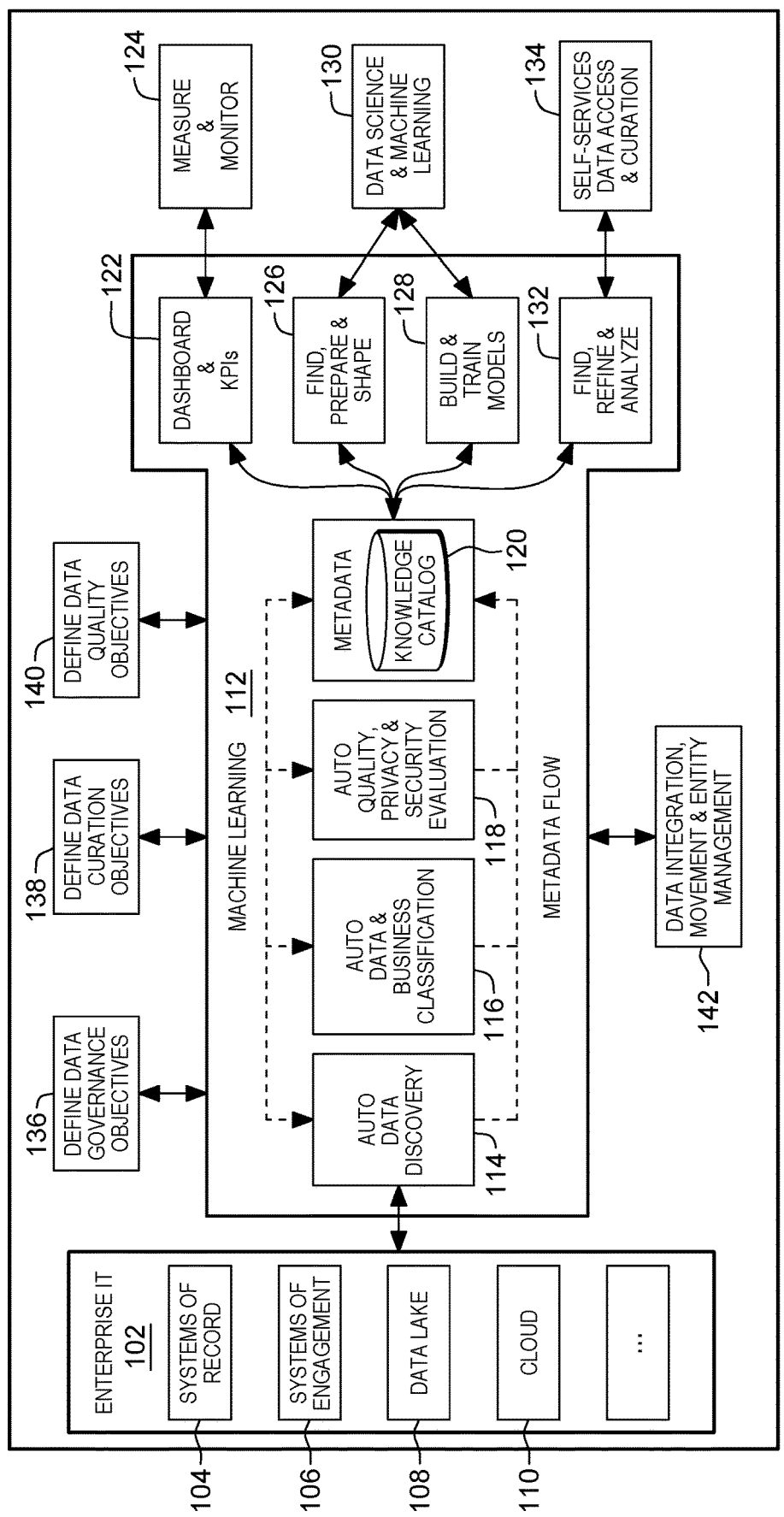
FIG. 1 depicts an example environment to incorporate and use aspects described herein.

Described herein are aspects directed to preparing, assessing, identifying and obtaining proper datasets for classification models and artificial intelligence (AI) dashboards.

Aspects described herein provide automatic identification of data and data sources to be added for training a model. Further training of a model is helpful only when the additional data that it is trained on provides useful information to the model. Aspects described herein can help identify important characteristics to capture in additional training data in order to ensure that the model is being effectively trained to address issues it has in improperly classifying data samples. In other words, aspects help identify characteristics that should be found when identifying additional samples to provide to the model so that it can better understand 'hyperplane' boundaries between model classes. This can help eliminate data quality issues to thereby improve model performance.

Accordingly, proposed are aspects for a cognitive data crawler based on identification of model gaps via postmortem analysis. As a general overview, and in an initial aspect, region metadata is generated using an embedding space of the training and/or validation data for the model and identified model gaps. By way of specific example, the samples are text and/or image data and the model is a classification model for classifying aspects of the text/images. Specific examples presented herein refer to classifying images by whether they depict a cat or a dog. This is by way of example only; aspects presented herein apply to other text and/or image classification models with different classifications for text, image, and/or other types of data.

A process performs model gap identification for a ML/DL model by examining embeddings of the training/validation dataset used to build the model. Embeddings present the classifications of the samples of the dataset in the embedding space. Based on the embedding space being embedded with the sample classifications, a process identifies the region(s) in the embedding space within which the model tends to incorrectly classify samples (also referred to herein as 'instances'). These regions, also termed "neighborhoods" herein, can be identified using a radius in the embedding space. Metadata can then be generated for each of the observed model gaps represented by the identified neighborhoods/regions. The metadata can include information about both the positive instance(s) (correctly classified instances) as well as negative instance(s) (wrongly classified instances) in each region. For image instances, metadata can include caption information of the images and their neighbors in the neighborhood. For text instance, metadata can include subjects, objects, and any relationships therebetween that are identified and tagged as a part of metadata. This may be performed for each neighborhood identified in the embedding space.

In another aspect, the process dynamically constructs knowledge graph(s) used to generate crawl paths and/or multimodal queries for querying data sources to obtain additional data for further training and improving the model. The queries may be generated to specifically target model gaps that were previously identified. A crawl path refers to a set of one or more queries to obtain the additional samples to address the gaps that were observe in the model's embeddings of the existing samples. Example types of queries are text-based queries, image-based queries, or a combination of the two (multimodal). As a specific example of a multimodal query, the multimodal query includes a text query that is run to deliver results, and then another query—an image based query—in which an image is submitted as input to identify similar images, and that image-based query is run against the results returned from the text query. Crawl paths could refer to uniform resource locators (URLs), links, query strings or the like, and/or a sequence of the foregoing, as examples.

A knowledge graph can be constructed by analyzing the metadata for the identified regions along with attributes and applicable visibility flags (described below). A knowledge graph is to capture composited information based on the multiple instances, both correctly and wrongly classified, in the neighborhood, in order to indicate knowledge about the samples in that neighborhood. It may be desired to target, via the generated queries, data samples that better train the model to correctly classify the samples of that neighborhood that were, or would be incorrectly classified into that neighborhood, and strengthen the model's confidence when classifying the instances that it correctly classifies in that neighborhood. The queries/crawl paths are generated based on attributes informed by the knowledge graph(s). Labels for sets of instances can be generated through, e.g., crowdsourcing, or can be determined based on the context around the identified/classified instances, as examples.

The knowledge graphs can be pruned and updated based on searches to discover data matching to the sample distribution gaps (the model gaps) identified from the embeddings, in order to identify data for populating a data dashboard for the model.

The model can be retrained in this manner on a repetitive basis. A model 'safety check' can be performed occasionally. Thus, in cases of imbalanced data, these aspects can identify samples to add as a part of the model training set to improve the model accuracy. Then a check on model stability can be performed, in which the process automatically performs tests that can indicate whether to halt the training in order to avoid 'overfitting' the model.

Accordingly, aspects present run-time query/crawl path determination based on model gaps in the distribution of data of existing datasets on which a model was trained/verified, including, for instance, determination of new crawl paths as multimodal searches/queries to discover data that addresses the sample distribution model gaps. This data can be obtained and automatically populated to the data dashboard for use in effectively retraining the classification model.

FIG. 1 depicts an example environment to incorporate and use aspects described herein. The example environment depicted is an example data operations (DataOps) environment including various components thereof. Enterprise information technology (IT) 102 includes various systems of record (104), systems of engagement (106), and data sources (data lake 108, including public and private data sets), cloud infrastructure 110, and optionally additional components (not depicted). Data lake 108 includes, as examples, one or more datastores/databases that can house various datasets.

Machine learning component 112 generalizes components in which various algorithms run, including automatic/automated data discovery 114, automated data and business classification 116, and automated quality, privacy, and security evaluation 118, which produces data, including metadata, for building and populating a knowledge catalog 120. Data in the knowledge catalog 120 (metadata) can be exposed and used in various ways, for instance (i) by dashboard and key performance indicators (KPIs) (122) for 'measure and monitor' activity 124, (ii) to find, prepare and shape data (126), and build and train models (128) used by data science and machine learning activity (130), and (iii) to find, refine, and analyze (132) through self-services data access and curation 134.

Government, risk, and compliance subject matter experts (SMEs), as an example, help define data governance objectives 136, data curation SMEs, as examples, held define data curation objectives 138, and data quality subject matter experts, as an example, help define data quality objectives 140. Meanwhile, data engineers, as an example, oversee data integration, movement, and entity management 142.

Aspects described herein are closely related to identifying and obtaining data from data source(s) (data lake 108), which includes sources having data for machine learning algorithms. New data and data sources can be identified and used in additional training of the model, and hence this can be used in Build/Train Classification Models processes (128).

Data augmentation can improve the accuracy of deep learning/machine learning based models. Example data augmentation methods for image augmentation include image rescaling, shear-based transformations, zoom-based transformations, translations, and flipping. Translation-based transformation for image augmentations include hue randomization, saturation randomization, brightness randomization, and contrast randomization. Example data augmentation methods for text augmentation include shuffling text elements to create new text, word replacement, and syntax-tree manipulation.

Data augmentation for images/text is one approach, however this does not address how to automatically identify crawl paths and other querying based on identified model gaps to improve model performance. Region metadata generation is provided using the embeddings of training/validation data and identified model gaps. Knowledge graphs can be constructed dynamically to inform crawl paths/queries to use. One aspect of classification model improvement as described herein includes improving model accuracy and performance by automatically determining useful crawl paths based on model gaps. The crawl paths are expected to be useful because they are generated to search for/locate data having specific identified characteristics that are for strengthening the model's ability to correctly classify samples having those characteristics. By obtaining additional samples (and proper labels for those samples) having those characteristics, the training of the model is targeted specifically to strengthening the model's ability to correctly classify based on those characteristics.

The ML/DL model can be retrained, and this can iterate until a model safety check dictates that retraining is to halt, for instance because of a risk of overfitting, as an example. In addition, aspects presented herein can consider budget constraints (e.g. in the form of computational cost, memory constraint, time, power consumption, and/or other resources).

Data collection includes data acquisition, data labeling, and handling of existing data. Data acquisition includes data discovery (via sharing and searching, for instance), augmentation using latent semantics and entity data integration, for instance), and data generation via crowdsourcing or from synthetic data (either general or specific), as examples. For data labeling, data with no labels can be manually labeled (through active learning and crowdsourcing, for instance), or undergo weak labeling via data programming and/or fact extraction, as examples. Data with some labels can be used in semi-supervised learning. Existing data can be improved, e.g. though data cleaning and relabeling, for instance. Also, classification models can be improved to make them more robust and potentially make use of transfer learning in which knowledge from one model is applied to improve other models.

Under an example data collection strategy, an initial inquiry is whether there is enough data for the particular application, for instance adequately training a classification model. If not, then if there are external datasets available, data discovery/augmentation can be performed. Additionally or alternatively, if there are data generation methods available, these can be used to generate data. If there is sufficient data for the particular application, then an inquiry is made as to whether to improve the existing data or model, or instead add labels to samples. If it is decided to add labels, then self-learning can be used if there are enough labels for self-learning. Otherwise, if there is a significant enough budget for crowdsourcing label identification, then that can be performed. Otherwise, it can be determined to use weak labels and therefore supervision.

If it is determined to improve the data/model, then it is determined whether existing data and labels are noisy and/or biased. If so, data and label improvement is undertaken. Otherwise, the existing model is deemed inaccurate and the model is improved.

Hyperplanes separate areas of the data embedding space for purposes of classification. Conceptually, they define the boundaries between the different classes in the embedding space. Using a straightforward example, assume the classification model is to classify images of animals, specifically cats and dogs, and therefore the classification of an image (a sample) classifies the animal depicted in the image as being either a cat or a dog. The embedding space is the overall domain in which the images (samples) are classified. Some dogs and cats may look similar, for instance based on size, color, posture, and other features, while some dogs may look entirely unlike any cat, and vice versa. Samples of dogs tending to appear similar to cats, and samples of cats tending to appear similar to dogs are positioned relatively close to each other in the embedding space. Dogs that appear entirely different from cats, sharing the least visual similarities, will be spaced relatively far apart in the embedding space from cats that appear entirely different from dogs.

In an ideal embedding, a line can be drawn to separate the cat samples from the dog samples and define the two classes in the embedding space. This is the concept of a hyperplane. Dogs tending to appear very dissimilar to cats will be farther from the hyperplane and less useful in defining the hyperplane than dogs tending to appear more similar to cats. Similarly, cats tending to appear very dissimilar to dogs will be farther from the hyperplane and less useful in defining the hyperplane than cats tending to appear more similar to dogs. The cat and dog samples that sit relatively near the hyperplane can be the most useful at defining the hyperplane because it is the classification of those samples that will most clearly define the hyperplane when they are classified properly.

Consideration of the hyperplane can be useful from a conceptual standpoint but does not answer the question of which additional samples are needed/desired for training the model so that the model can better understand the boundaries between classes and therefore more accurately classify samples.

Figure 2:
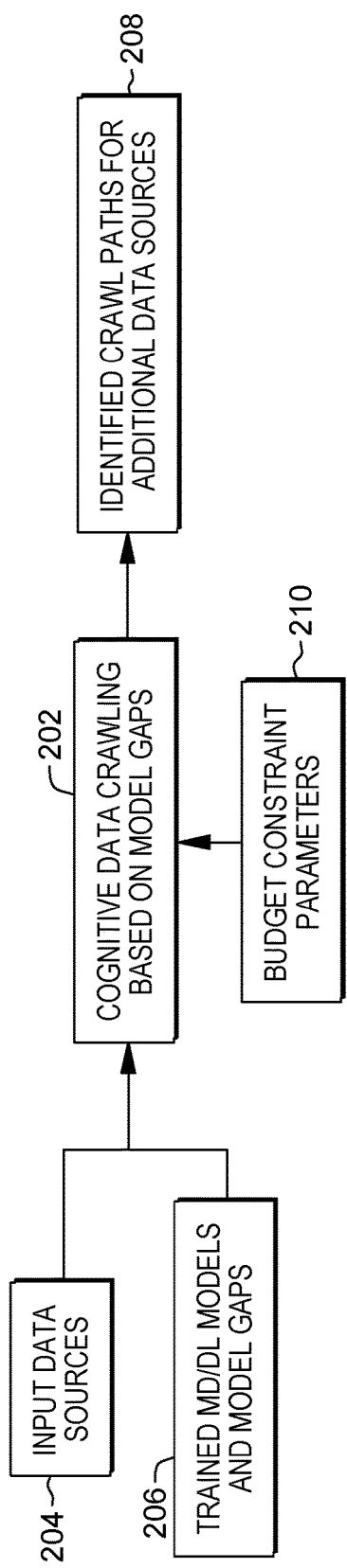
FIG. 2 depicts an example input-output diagram for a cognitive data crawler, in accordance with aspects described herein.

FIG. 2 depicts an example input-output diagram for a cognitive data crawler, in accordance with aspects described herein. Input to process(es) (202) for cognitive data crawling based on model gaps include (i) input data sources 204 (e.g. sources of data lake 108) and (ii) trained machine learning/deep learning models along with identified model gaps 206. Aspects discussed herein take these as input and produce identified crawl paths for additional data sources 208 to improve the classification model accuracy and performance. In addition, budget constraint parameters 210, such as computations costs, memory constraints, time, power, and/or any other budgetable resource, can factor into the identification and suggestion of crawl paths or other types of queries produced as output of 202.

Figure 3:
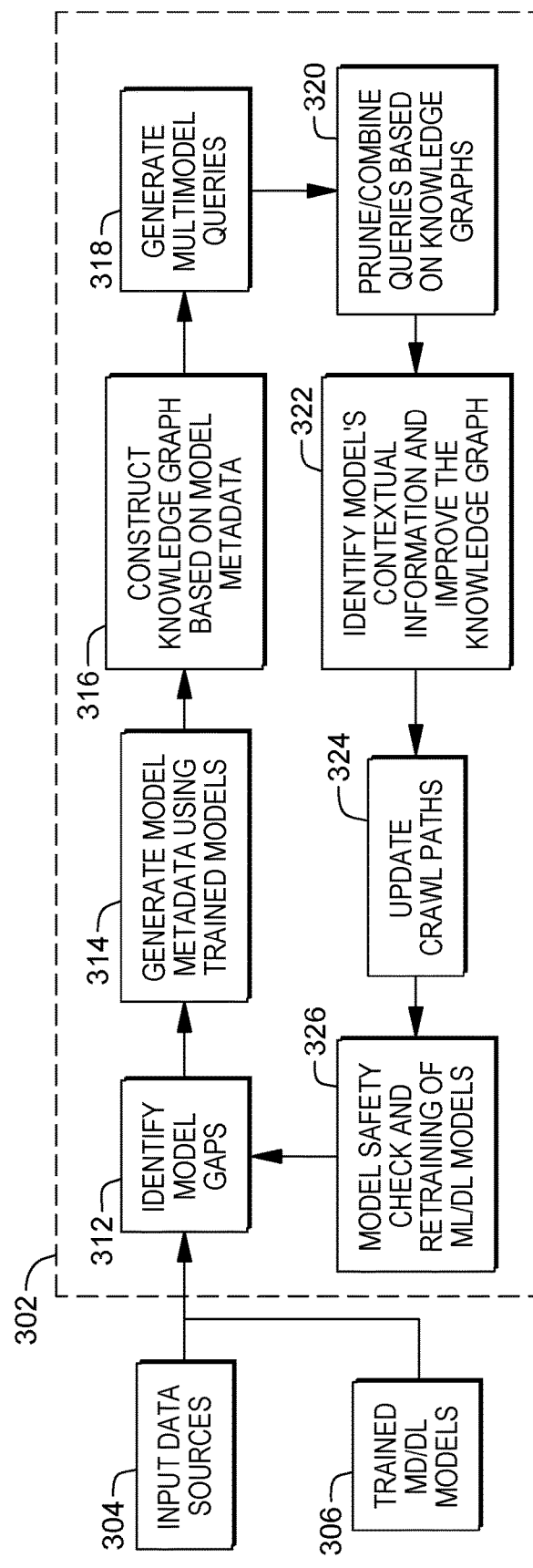
FIG. 3 depicts example cognitive data crawler components and processes, in accordance with aspects described herein.

FIG. 3 depicts example cognitive data crawler components and processes, in accordance with aspects described herein. Input data sources 304 and a trained model 306 are fed into a cognitive data crawler process 302. The process identifies (312) model gaps/neighborhoods and generates (314) model metadata. The process then constructs (316) a knowledge graph for each identified neighborhood. The knowledge graphs can be analyzed in the aggregate to expand/combine/prune knowledge graph(s). In some examples, a goal is to construct a large but accurate knowledge graph with statistically-accurate attributes for properly classified and wrongly classified samples.

From the knowledge graphs, the process generates (318) queries, optionally some or all being multimodal queries. These are then pruned and/or combined (320) based on the knowledge graphs and any applicable budget constraints that may have been specified. While a particular number of different queries may be been generated, it may not be necessary to run each of those individual queries. Pruning queries might include combining or tailoring queries to target additional samples that have characteristics directed to those found in several neighboring gaps in order to improve classification of samples for those neighboring gaps. The knowledge graphs constructed for neighborhoods situated relatively close together in the embedding space are expected to look similar, and therefore query results may be returned with samples useful for training one or more nearby neighborhoods. It may be desired for budgetary or other reasons to tailor some queries to deliver results that can be useful to multiple model gaps.

The process also identifies (322) the model's contextual information for improving the knowledge graphs. This seeks to improve each of the knowledge graphs and structure to consolidate, where appropriate, and de-segment model gaps to the extent possible. This is similar to consolidation that can happen as part of 316, and in fact in some aspects 316, 318, 320 and 322 can form a loop that iterates one or more times until an acceptable number and/or complexity of queries has been obtained that are specifically and appropriately targeted to sample characteristics such that additional samples for those regions in the embedding space can help to 'patch' the inaccuracies represented by the model gaps.

The process updates (324) the crawl paths. From there, this process or other process(es) utilize the updated crawl paths/issue the queries to obtain the additional data being sought. The model may then additionally be trained on the newly obtained data.

The process of FIG. 3 also performs (326) a model safety check to determine whether to halt, at least temporarily, retraining the model. A halt may be desired for any of various reasons. One is to avoid 'overfitting' the model. Another is that eventually the model may classify with such a high accuracy that further training may lease to insignificant improvement as it will be focusing on gaps that are of minor significance, e.g. such that misclassifications in those gaps are tolerable. Assuming that the safety check indicates that it is not time to halt, the process can iterate (i.e. through 312, 314, etc.), eventually leading to again retraining and refining the model (326), and another safety check.

Figure 4:
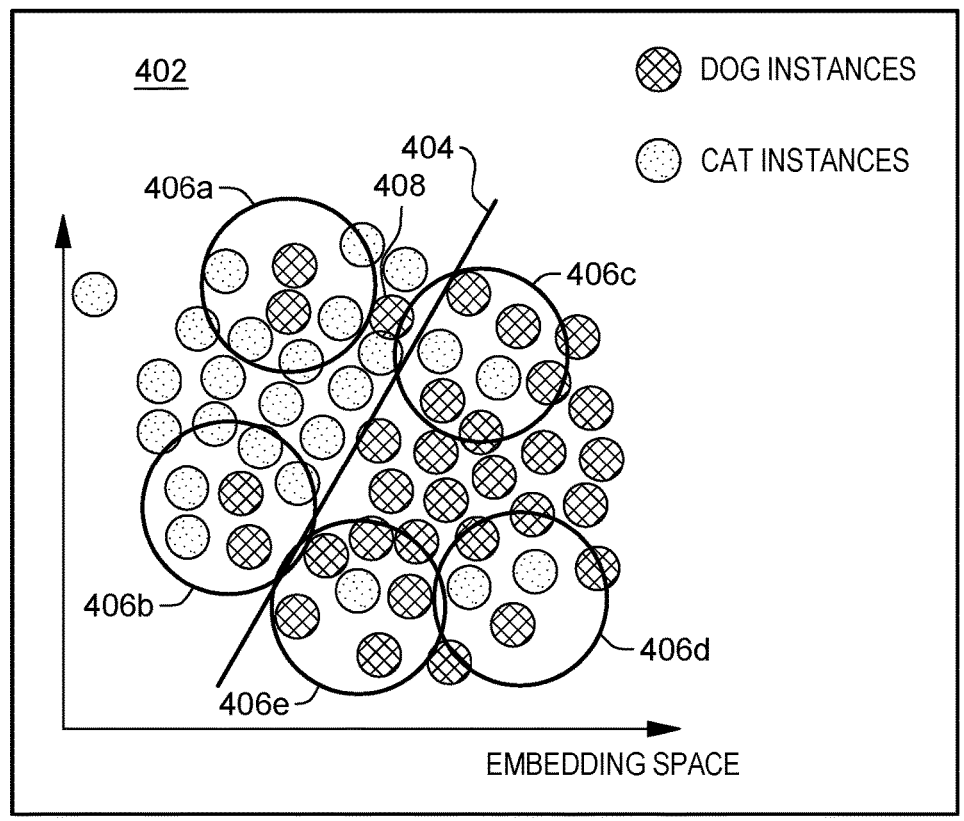
FIG. 4 depicts an example representation of model gap identification in an embedding space, in accordance with aspects described herein.

Further details of aspects of FIG. 3 are now provided. FIG. 4 depicts an example representation of model gap identification in an embedding space, in accordance with aspects described herein.

Initially, a process obtains an embedding of a collection of samples in an embedding space. The samples are classified by a classification model and are part of an initial dataset. The embedding presents a respective classification of each sample of the collection of samples by the classification model. As specific examples, the samples are images (image data), text data, or both.

The embedding can be used to identify classification gaps of the classification model. Referring to FIG. 4, presented is a graphical depiction of the embeddings of samples ("instances") in an embedding space 402. The graphical depiction in this example is on two dimensions (x-axis and y-axis) for purposes of simplicity, and the axes can represent any desired, discernible characteristics of the samples. The dots in the embedding space 402 represent specific samples that have been classified. Circles shown in cross-hatch represent samples classified as dogs, while circles shown in stipple represent samples classified as cats. Hyperplane 404 represents the divide between the class 'Cat' (on the left side of hyperplane 404) and class 'Dog' (on the right side of hyperplane 404).

The process identifies instances that were wrongly classified, which, in the context of this description, can encompass (i) samples that were wrongly classified and as well as (ii) samples which were classified (incorrectly or correctly) but with some confidence level below a given threshold. Thus, "wrongly classified" instances could be those are affirmatively misclassified or instances (correctly or incorrectly classified) that were made with a sufficiently low (below a threshold) confidence level.

The process also identifies/defines neighborhoods around wrongly classified instances. The neighborhoods may be defined by any number (1 or more) of wrongly-classified instances, and in this example are defined in part using a radius r in the embedding space. The radius defines a region of the embedding space centered (approximately) around one or more incorrectly classified samples. The r radius can be set by any desire means, for instance as a configurable parameter, determined empirically, etc. It is noted that too small a radius will define neighborhoods of too little area, potentially not capturing enough correctly and/or incorrectly classified instances to produce a meaningful enough knowledge graph, while too large a radius can define an area too large that leads to construction of a knowledge graph that is not sufficiently targeted to the specific characteristics that are leading to the misclassifications in that neighborhood. A proper r value could be learned over time after iterating over a sufficient number of models and retrainings, as one example.

Misclassifications identified in the embedding space can inform characteristics that help define the problem area(s) of the model, i.e. embedding 'regions' in which the model does not distinguish well enough between samples. Using the example of cats and dogs, it is possible, for instance, that the model has not seen certain characteristics of cats that would help it to identify that those characteristics are common in cats as opposed to dogs.

In FIG. 4, the process defines five neighborhoods: 406a, 406b, 406c, 406d and 406e. Each such neighborhood includes both correctly classified samples (those that were correctly classified as a cat or dog) and incorrectly classified samples (those that were classified as one of a cat or a dog but which are actually the other). It may be desired to define neighborhood size such that the neighborhood captures some 'truths' (correctly classified instances) among the incorrect classification(s) in the neighborhood because this can help identify characteristics of both proper classifications and improper classifications in those regions.

It is also noted that it may not be the case that each wrongly classified instance embedded in the embedding is necessarily captured within some neighborhood. Sample 408 in FIG. 4 was wrongly classified yet is not included in a neighborhood. This could occur for a variety of reasons. In this example, the process defines neighborhoods 406a and 406c, between which sample 408 squarely sits. It may be anticipated that further training to correctly classify samples properly sitting in regions 406a and 406c will better equip the model to correctly classify sample 408 on a next run. Additionally or alternatively, iterating the process (of FIG. 3) could see sample 408 included in a neighborhood on a next run.

A set of metadata can be generated to describe each identified region 406a-406e. The metadata can be automatically generated (and/or manually identified) to describe the samples in the respective neighborhood, including both the correctly classified samples in the neighborhood and the incorrectly classified samples in the neighborhood. For image samples, captions can be generated along with those visual instances of the classified samples and their neighbors as a part of model metadata that describe the regions 406, for instance. In cases where the collection of samples include text, then object, subject, and relationship metadata can be generated about the text samples.

Ultimately, with the model gaps identified, the process can attempt to characterize the types of data samples (possibly ones with a known label/classification) that would, if obtained, used in training the model, and embedded, fall within those neighborhoods and provide additional 'truths' as to classifications. This would train the model to better classify samples that fall into those problem neighborhoods. Running the model again against prior-misclassified samples can be expected to present some improvement in the form of a different (e.g. correct) embedding of those previously-wrongly classified samples. When misclassifications are eliminated, the model gaps disappear.

Model metadata contains information related to instances and their captions if available. Knowledge graphs can be built with instance attributes. A process constructs, using the automatically generated metadata, knowledge graphs that inform attributes of correctly classified samples and incorrectly classified samples. A respective knowledge graph can be constructed for each neighborhood, of the identified neighborhoods, based on the metadata generated for that neighborhood. The process can additionally combine attributes informed by at least some of the constructed knowledge graphs to construct aggregate knowledge graph(s).

Metadata generation can include obtaining captions for samples using conventional caption techniques to enrich knowledge graphs, as can identifying common relationships between neighboring instances, and generating object-subject annotations (for instance left leg (object) of person (subject)). Additionally or alternatively, visibility flag can be included for attributes in samples. For instance, using again the example of classifying images of dogs and cats, there can be a flag indicating whether all four legs of the animal are visible, a flag indicating whether both sides of the animal's face are visible, and a flag indicating whether the animal has at least one eye closed. Flags can be useful in parameterizing queries. If the model has trouble correctly classifying images of cats when fewer than all four legs are showing and the cat's head is turned, these flags can be helpful both in identifying those particular characteristics of the samples, and also in query generation to target samples with those characteristics. Additional metadata generation can include identifying physical relationships to capture visual attributes.

Using an example in which instances are not properly being classified as cats, assume that a sample image that is improperly classified shows a cat that is partially seated, with its two front two paws visible and one hind leg visible and scratching the cat's head that is twisted and facing downward so that only one eye is visible in the picture. Possible captions for the image, which may be generated by any of various available image captioning techniques, include: 'itchy cat', 'three legs of the cat are visible', 'bi-colored cat' and 'one eye of the cat is not visible due to rotated face'. These captions are example metadata that can be automatically generated for this instance/sample.

Metadata is used to generate the knowledge graph(s) to represent information about the class(es), and more specifically the particular regions of the identified neighborhoods of the embedding space that are targeted for additional training and improvement. The knowledge graphs can inform keywords and phrases (and any other attributes of samples) that may be used in building queries. Queries are generated based on the attributes informed by the knowledge graphs. An overall goal of the querying may be to find additional data that will improve the model, particularly data that properly is embedded into the defined neighborhoods. Thus, the queries are tailored, based on the attributes, to retrieve additional training data for training the classification model to more accurately classify samples and avoid incorrect sample classification.

Accordingly, multiple knowledge graphs may be built based on the model gaps that have been identified. Attributes are captured for both positively and negatively classified instances, and initial knowledge graph(s) may be built by analyzing the metadata (e.g. captions) of the instances in the neighborhood region. Then, text and/or image-based queries are generated based on knowledge graph attributes. Flags indicating visibility or absence of various objects, traits, or other characteristics can be included and used to better tailor the searches. A generative adversarial network (GAN)-based model may be used to automatically generate images based on the captions and these can be used in conjunction with generated text queries for multimodal search queries, for instance. By way of specific example, an image-based query that queries for pictures of itchy cats could provide as a search parameter an image of a cat scratching itself. The expected results of that image-based query could be similar images, i.e. pictures of itchy cats. An example text query could use a text string, such as "itchy cat" to search for images of itchy cats. An example multimodal query in this context could start with the text-based image search/query to obtain some image search results, and then feed the image of the itchy cat to perform a follow-on image-based search against those results to further refine the image search results. Generated queries can additionally/alternatively be implemented as crawl paths for crawling remote resources to retrieve the additional training data.

Figure 5:
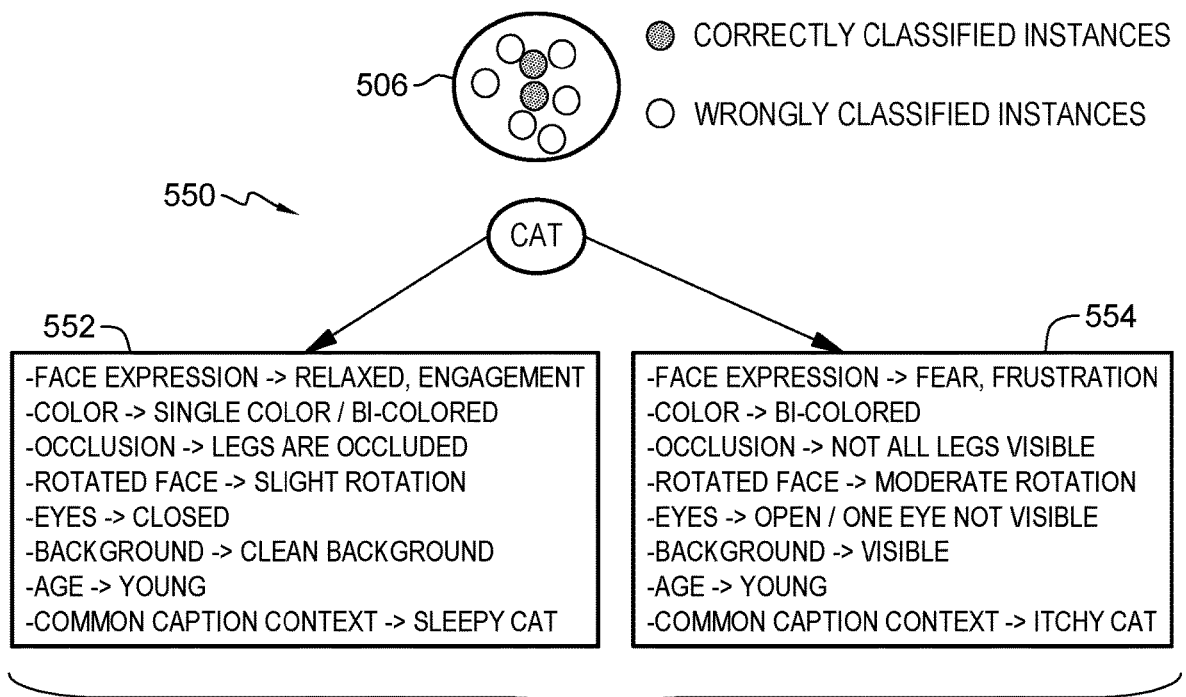
FIG. 5 depicts an example representation of a knowledge graph, in accordance with aspects described herein.

FIG. 5 depicts an example representation of a knowledge graph, in accordance with aspects described herein. 506 depicts a neighborhood of the embedding space showing eight embeddings. This neighborhood is in the 'cat' class of the embedding space. Samples shown by stipple-shaded circles represent samples correctly classified as cats, while samples shown by unfilled circles represent samples not classified as cats (e.g. incorrectly classified as dogs). 550 is an example knowledge graph with attributes for correctly classified instances (552) and attributes for wrongly classified instances (554). Attributes 552 are characteristics of the correctly classified samples from region 506. The samples depict cats having one or more (or at least some defined threshold of) attributes listed. Attributes of the correctly classified samples show cats with facial expressions that are relaxed and engaged; cats that are single or bi-colored; images in which leg(s) are not visible, hidden, blocked, occluded, obstructed or the like; cats whose faces are shown slightly rotated; cats with eyes closed; cats shown against a relatively clean background; cats that a relatively young; and images with common caption context reflecting a sleepy cat. Attributes of the wrong classified samples show cats with facial expressions that show fear or frustration; cats that are bi-colored; images in which not all legs are visible; cats whose faces are shown moderately rotated; cats with eyes open or one eye not visible; cats shown against visible backgrounds; cats that are relatively young; and images with common caption context reflecting an itchy cat.

Generating and issuing queries returns additional data, some or all of which can be used in further training the model. In this regard, the retrieved data, if not already labeled with a proper class, can be labeled using any desired technique(s). If a search engine is being used, this may come with at least some reasonable level of confidence that the queries run through the engine are delivering truly similar (i.e. same class) results. As a simple example, a large percentage of the first 20 results from performing a search of the word "dog" in a common image search engine may reasonably be expected to be images of dogs. Similarly, it might be assumed that providing an image of a dog to an image search engine to find "similar" images is likely to provide many results that are, in fact, pictures of dogs. Labels could therefore be automatically applied. Data results can be annotated/labeled automatically and/or labeled manually, for instance by subject matter experts.

The process can rank the generated queries into a ranked list of queries, for instance based on budget constraints. Selection of which queries to issue can therefore be from the list based on applying budget(s) defining constraint(s) on resources to execute those queries. Resources to execute queries typically translate into costs to the querying entity. Example resources include computing cost, memory, time, and electrical power, though there are others.

In addition, some queries may be combinable. For instance, it can be inefficient and costly to issue two relatively similar queries that are expected to provide similar results. A sentence embedding technique or other textual analysis may be used to identify similar generated textual queries and either discard one of them or combine them. Each text query can be represented in a vector space, and this can help identify queries that are similar. Similarly, image-based queries could be combined.

Additionally or alternatively, complex textual queries may be split into multiple queries, one or more of which may be selected for issuance. Splitting can further tailor the queries to a narrower search base and improve accuracy in proper data/data source identification and retrieval.

Historical query/crawl path information may also be used to prune-away some of the generated queries. It can be wasteful to issue queries that are relatively similar to one or more that were already previously issued. If a generated query is similar to a prior query, the system could take this as an indication to make the generated query more complex on the basis that the earlier query may have been too broad to obtain quality additional data for further training the model to patch earlier-identified model gap(s).

Additionally or alternatively, in aggregating knowledge graphs, this could reduce the number and/or complexity of queries generated in the first place. Some of knowledge graph(s) could be pruned to improve computational cost in that the complexity of the knowledge graph and the number of attributes present in the knowledge graph could be reduced for a similar effect on the queries generated based thereon.

The process issues at least one of the generated queries and retrieves, in response, additional samples on which to train the classification model. The process can retrain the classification model using the additional samples to improve the model. This process of obtaining embeddings, identifying incorrectly classified samples, defining neighborhoods, automatically generating metadata, constructing knowledge graphs, generating queries, issuing quer(y/ies), retrieving additional samples, and retraining the classification model can iterate or more times. As noted, a model safety check can be performed periodically, e.g. between iterations, to assess model stability and perform test(s) to avoid the overfitting of the model. Accordingly, the process can check whether to halt the iterating by testing stability of the classification model and determining whether a threshold (that defines when to halt the process) has been reached to avoid overfitting the classification model.

Figure 6:
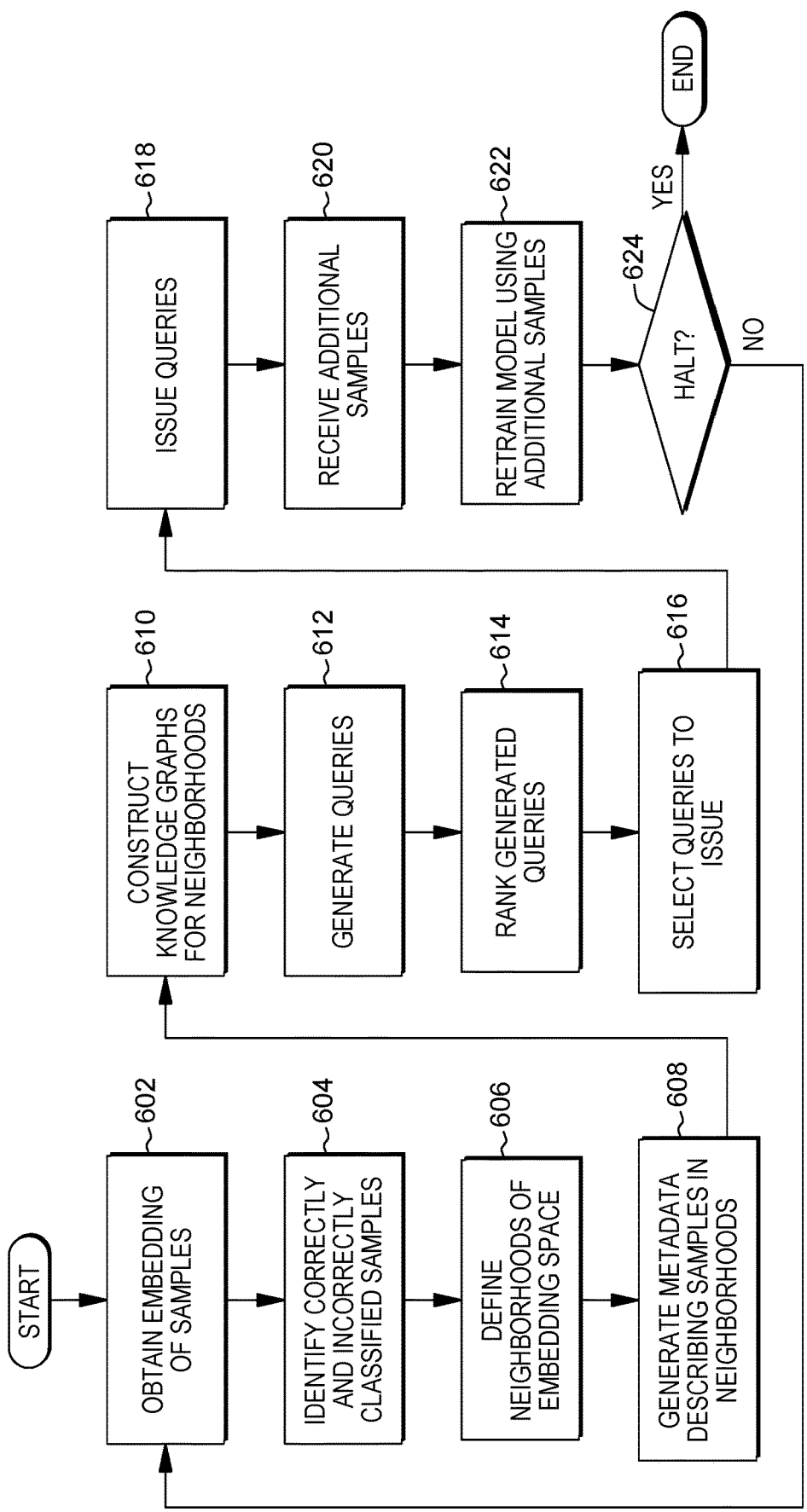
FIG. 6 depicts an example process for targeted data acquisition for model training, in accordance with aspects described herein.

FIG. 6 depicts an example process for targeted data acquisition for model training, in accordance with aspects described herein. In some examples, the process is performed by one or more computer systems, such as those described herein, which may include one or more computer systems of or connected to a machine learning system(s) and/or enterprise IT systems, one or more cloud servers, and/or one or more other computer systems. Thus, in some embodiments, only some aspects of the method are performed by one (or more) computer system(s) and only other aspects of the method are performed by one (or more) other computer systems. In this manner, embodiments of the present disclosure can include one, some, or all aspects discussed with reference to FIG. 6.

An advantage of aspects of FIG. 6 is the automatic identification of the kind of data sources, and specific data, to be added for training a model in order for the model to learn critical characteristics of samples and provide targeted improvement in the model. This includes identification of important characteristics to capture in additional training data in order to ensure that the model is being effectively trained to address identified issues in the model improperly classifying data samples. Further advantages include identifying characteristics of additional samples to seek out and provide for training the model so that the model can better understand 'hyperplane' boundaries between model classes. This can advantageously help eliminate data quality issues and thereby improve model performance.

The process of FIG. 6 includes obtaining (602) an embedding of a collection of samples, of an initial dataset, in an embedding space. The embedding presents a respective classification of each sample of the collection of samples by a classification model. In some examples, the collection of samples includes images and/or text samples. The process proceeds by using the embedding to identify classification gaps of the classification model. Thus, the process proceeds by identifying (604) incorrectly classified samples embedded in the embedding space. The incorrectly classified samples are samples, of the collection of samples, that the classification model incorrectly classified. 'Incorrectly classified' samples in this context can refer to samples that were wrongly classified and/or samples that were correctly classified but with a confidence level/score below some defined threshold confidence level/score.

The process defines (606) neighborhoods of the embedding space, where each neighborhood of the neighborhoods includes a respective (i) at least one incorrectly classified sample of the identified incorrectly classified samples and (ii) a respective at least one correctly classified sample, embedded in the embedding space, that the classification model correctly classified. In some embodiments, defining the neighborhoods includes using at least one radius to define a region of the embedding space centered around an incorrectly classified sample, where the region defines a neighborhood of the neighborhoods, and where any samples within the region are samples within that neighborhood. An embodiment in which a radius-based approach to neighborhood definition is used has an advantage in that it enables convenient, selective tailoring of neighborhood size to capture an appropriate number of samples to define a targeted region of the embedding space that is presenting problems for the model in terms of properly classifying samples of that targeted region. Too large a region can present problems in terms of too large a number of characteristics that could be affecting model performance of the region (and therefore targeting specific data samples to improve the model), while too small a region can present problems in terms of identifying specific characteristics to target in samples to improve the model.

The process automatically generates (608) metadata describing the samples in the neighborhoods, including both correctly classified samples in the neighborhoods and incorrectly classified samples in the neighborhoods. This can include generating metadata for each neighborhood of the neighborhoods. In cases where the collection of samples includes images and text, then the automatically generated metadata can include (i) caption information of the images and (ii) object, subject, and relationship information of the text. An advantage provided is that these forms of metadata enable efficient identification of additional samples to target model improvement.

The process also constructs (610), using the automatically generated metadata, knowledge graphs that inform attributes of correctly classified sample(s) of the collection of samples and incorrectly classified sample(s) of the collection of samples. Constructing the knowledge graphs can include constructing a respective knowledge graph for each neighborhood of the neighborhoods based on the metadata generated for that neighborhood. The process optionally combines attributes informed by at least some of the constructed knowledge graphs to construct an aggregate knowledge graph. This has an advantage in that it can reduce the number of queries proposed to issue for additional searching while still targeting samples with characteristics most expected to improve the model.

Based on the attributes informed by the knowledge graphs, the process generates (612) queries tailored, based on the attributes, to retrieve additional training data for training the classification model to more accurately classify samples and avoid incorrect sample classification. In cases where attributes informed by more than one constructed knowledge graph are combined in the construction of aggregate knowledge graph(s), the generating the queries generates at least one query of the generated queries from the aggregate knowledge graph. Generating queries from the aggregate knowledge graph can result in reducing the number of queries that might have otherwise been proposed if the knowledge graphs were not aggregated. Reducing the number of queries proposed to issue for additional searching while still targeting samples with characteristics most expected to improve the model can provide cost savings. The generated queries can be implemented as crawl paths for crawling remote resources to retrieve the additional training data. Additionally or alternatively, at least some of the generated queries can be multimodal, in which a multimodal query queries for both text and image results. An embodiment in which at least some of the generated queries are multimodal has an advantage of delivering more accurate results when multiple modes are utilized. An embodiment in which multimodal queries are generated, used, and implemented as crawl paths has an advantage in that the crawling can use intermediate results and feedback to perform refined/follow-on searches (perhaps in different mode(s), e.g. image, text) to identify more appropriate and relevant samples.

The process ranks (614) the generated queries into a ranked list of queries, and selects (616), from the ranked list of queries, one or more quer(y/ies) to issue. Selecting the queries can apply a budget that includes one or more constraints on resources to execute the query. Example such resources include computing cost, memory, time, and/or electrical power. This has an advantage in that it can reduce the number of queries and scope thereof according to budgetary considerations and therefore provide cost savings, while still targeting useful additional samples for improving the model. The process then issues (618) at least one query of the generated queries, and retrieves, in response to the issuing, additional samples on which to train the classification model. The process also retrains (622) the classification model using the additional samples. This has an advantage in that the retrieval of effective additional samples and training of the model on those samples most effectively trains the model to address identified issues thereof in embedding regions that are deemed most problematic in terms of proper classification.

The process also determines (624) whether to halt, for instance by testing stability of the classification model and determining whether a threshold has been reached to avoid overfitting the classification model. If it is determined to halt (624, Y), the process ends. Otherwise (624, N), the process returns to 602 to iterate. Iterating has an advantage in that the model may be continually improved, building on improvements of past iterations. An additional advantage is that the check to halt can help avoid overfitting the model and therefore degraded model performance.

In some examples, visibility flags are used in tailoring queries. For instance, the collection of samples that the model embeds can include images, in which case at least some of the informed attributes can include an indication of an object or other feature depicted in at least some of the images. The automatically generated metadata can include visibility flag(s) indicating whether, e.g., the object/feature is visible in the images. The generating of the queries can use the visibility flag(s) in determining whether to tailor at least one query to include or omit results in which the object/feature is visible. This has an advantage in that the visibility flags can provide straightforward search query parameterization for targeted searching of additional data samples.

As noted above, some embodiments described herein involve performance of just some aspects described with reference to FIG. 6. For instance, in one embodiment, a method includes automatically generating metadata describing samples, of an initial dataset, in neighborhoods of an embedding space in which the samples are embedded, the samples described by the automatically generated metadata being classified by a classification model, and including both correctly classified samples in the neighborhoods and incorrectly classified samples in the neighborhoods. The method can also identify attributes of one or more correctly classified samples of the collection of samples and one or more incorrectly classified samples of the collection of samples, and generate queries based on the identified attributes, the queries tailored, based on the attributes, to retrieve additional training data for training the classification model to more accurately classify samples and avoid incorrect sample classification. The process could, in some embodiments, obtain an embedding of a collection of samples, of the initial dataset, in the embedding space, where the embedding presents a respective classification of each sample of the collection of samples by the classification model. Additionally, in a further embodiment, the method could perform defining of the neighborhoods of the embedding space, where each neighborhood of the neighborhoods includes a respective at least one incorrectly classified sample of the collection of samples, embedded in the embedding space, that the classification model incorrectly classified and a respective at least one correctly classified sample of the collection of samples, embedded in the embedding space, that the classification model correctly classified, and where the samples described by the automatically generated metadata are samples in the defined neighborhoods.

Additionally or alternatively, the method can further include constructing, using the automatically generated metadata, knowledge graphs that inform the identified attributes of the one or more correctly classified samples of the collection of samples and the one or more incorrectly classified samples of the collection of samples.

Although various examples are provided, variations are possible without departing from a spirit of the claimed aspects.

Figure 7:
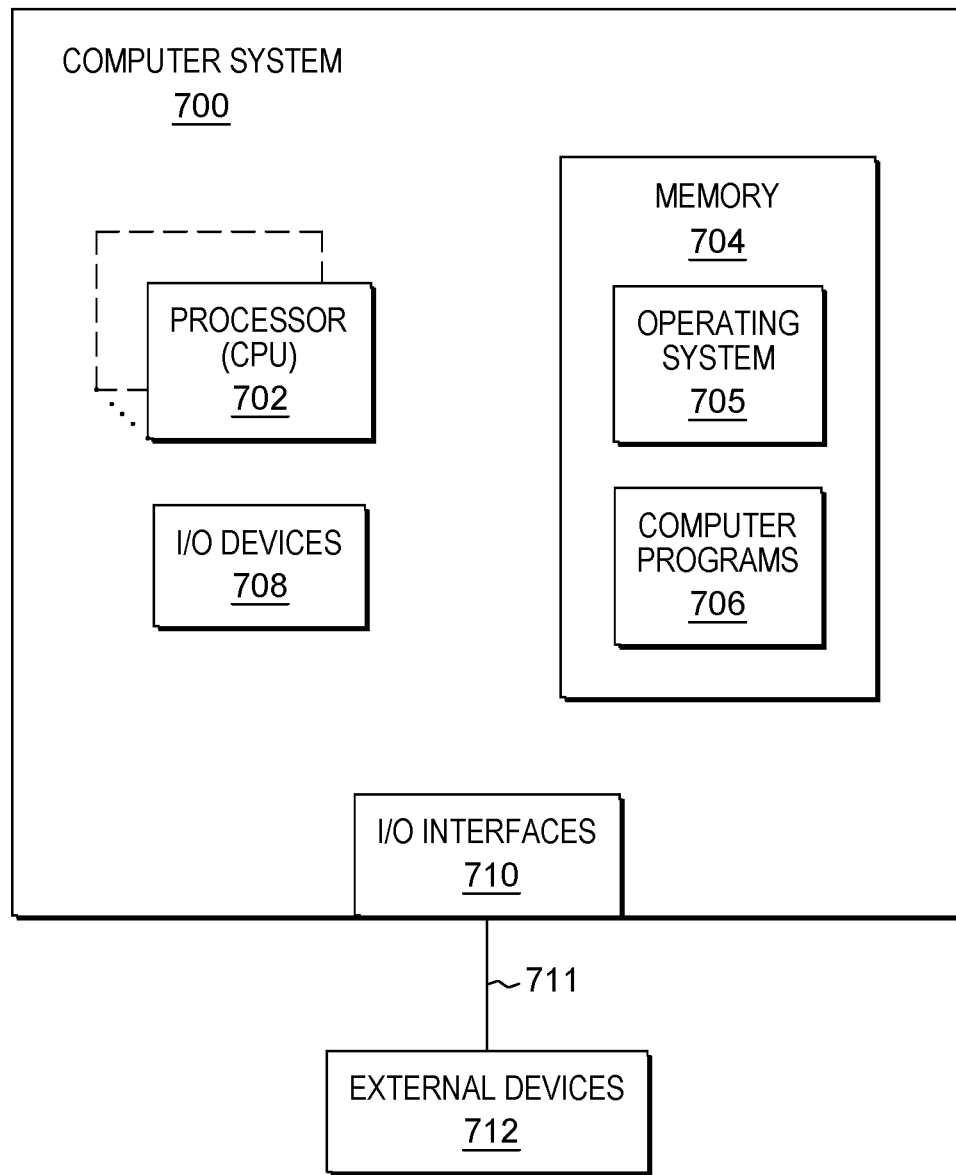
FIG. 7 depicts one example of a computer system and associated devices to incorporate and/or use aspects described herein.

Processes described herein may be performed singly or collectively by one or more computer systems. FIG. 7 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 7 shows a computer system 700 in communication with external device(s) 712. Computer system 700 includes one or more processor(s) 702, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 702 can also include register(s) to be used by one or more of the functional components. Computer system 700 also includes memory 704, input/output (I/O) devices 708, and I/O interfaces 710, which may be coupled to processor(s) 702 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 704 can be or include main or system memory (e.g. Random Access Memory) used in the execution of program instructions, storage device(s) such as hard drive(s), flash media, or optical media as examples, and/or cache memory, as examples. Memory 704 can include, for instance, a cache, such as a shared cache, which may be coupled to local caches (examples include L1 cache, L2 cache, etc.) of processor(s) 702. Additionally, memory 704 may be or include at least one computer program product having a set (e.g., at least one) of program modules, instructions, code or the like that is/are configured to carry out functions of embodiments described herein when executed by one or more processors.

Memory 704 can store an operating system 705 and other computer programs 706, such as one or more computer programs/applications that execute to perform aspects described herein. Specifically, programs/applications can include computer readable program instructions that may be configured to carry out functions of embodiments of aspects described herein.

Examples of I/O devices 708 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (712) coupled to the computer system through one or more I/O interfaces 710.

Computer system 700 may communicate with one or more external devices 712 via one or more I/O interfaces 710. Example external devices include a keyboard, a pointing device, a display, and/or any other devices that enable a user to interact with computer system 700. Other example external devices include any device that enables computer system 700 to communicate with one or more other computing systems or peripheral devices such as a printer. A network interface/adapter is an example I/O interface that enables computer system 700 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 710 and external devices 712 can occur across wired and/or wireless communications link(s) 711, such as Ethernet-based wired or wireless connections. Example wireless connections include cellular, Wi-Fi, Bluetooth®, proximity-based, near-field, or other types of wireless connections. More generally, communications link(s) 711 may be any appropriate wireless and/or wired communication link(s) for communicating data.

Particular external device(s) 712 may include one or more data storage devices, which may store one or more programs, one or more computer readable program instructions, and/or data, etc. Computer system 700 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 700 may be operational with numerous other general purpose or special purpose computing system environments or configurations. Computer system 700 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
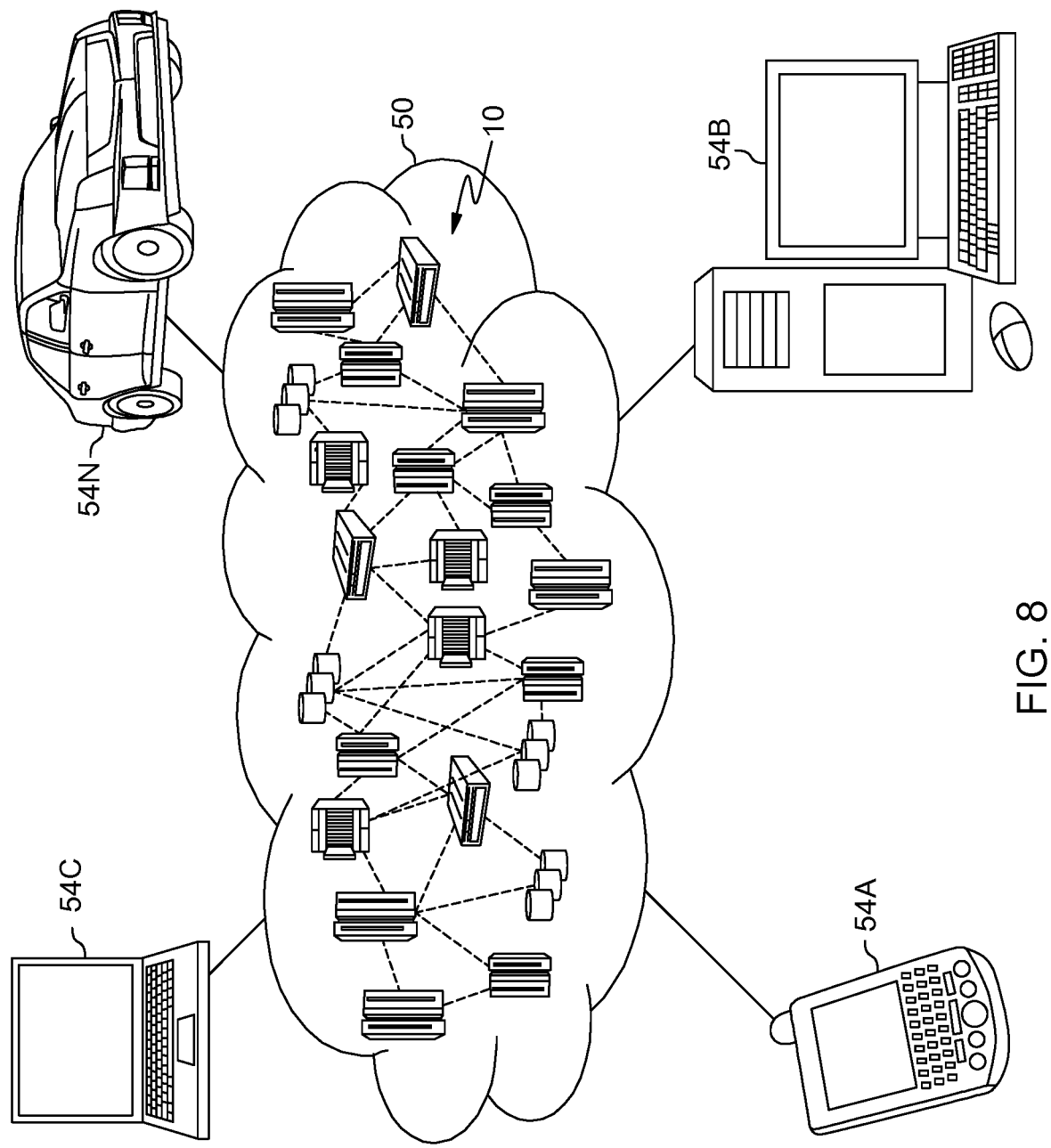
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
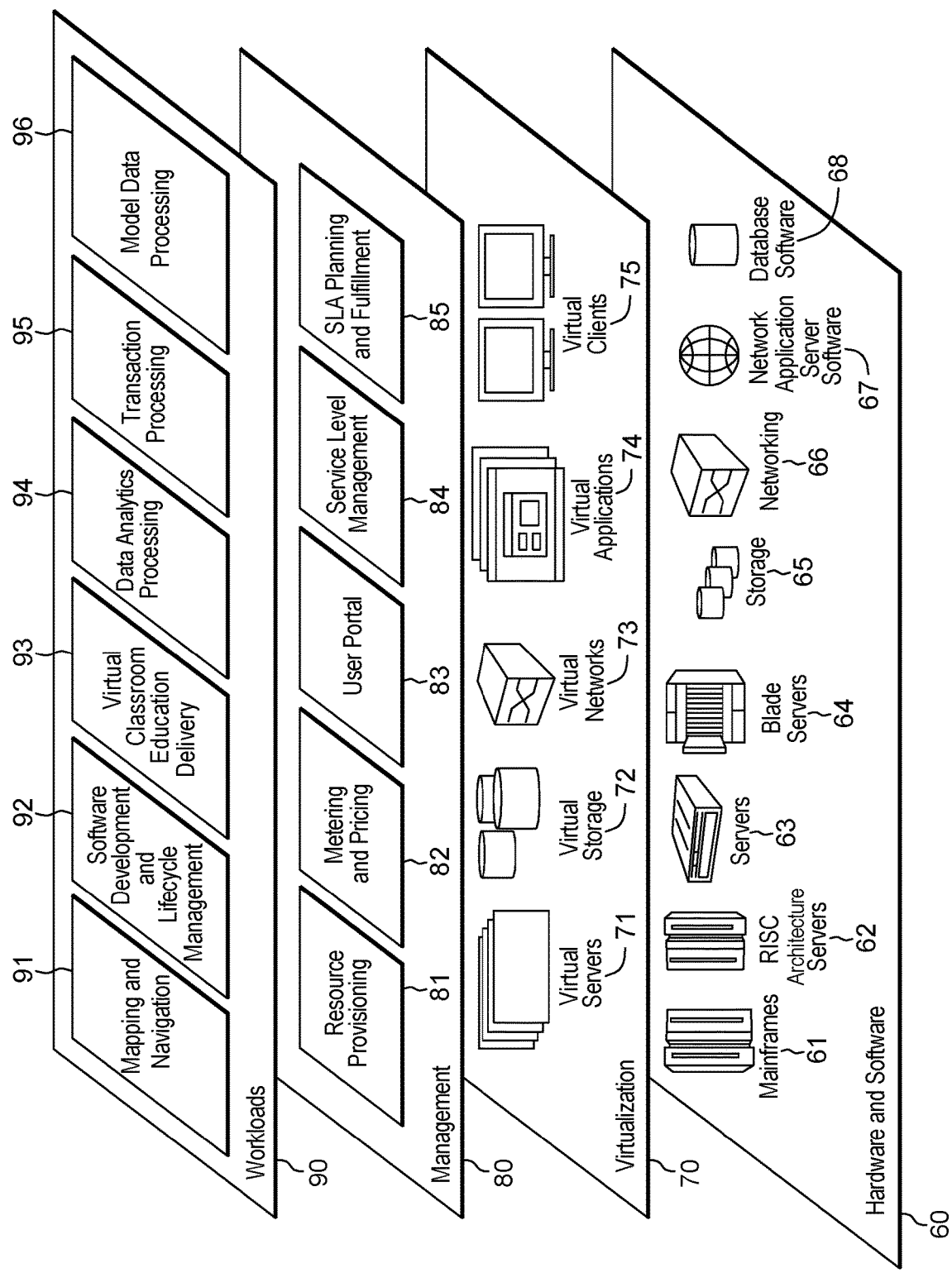
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and model data processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
automatically generating metadata describing samples, of an initial dataset, in neighborhoods of an embedding space in which the samples are embedded, the samples described by the automatically generated metadata being classified by a classification model, and including both correctly classified samples in the neighborhoods and incorrectly classified samples in the neighborhoods;
identifying attributes of one or more correctly classified samples of the collection of samples and one or more incorrectly classified samples of the collection of samples; and
generating queries based on the identified attributes, the queries tailored, based on the attributes, to retrieve additional training data for training the classification model to more accurately classify samples and avoid incorrect sample classification.

2. The method of claim 1, further comprising:
obtaining an embedding of a collection of samples, of the initial dataset, in the embedding space, the embedding presenting a respective classification of each sample of the collection of samples by the classification model; and
defining the neighborhoods of the embedding space, wherein each neighborhood of the neighborhoods comprises a respective at least one incorrectly classified sample of the collection of samples, embedded in the embedding space, that the classification model incorrectly classified and a respective at least one correctly classified sample of the collection of samples, embedded in the embedding space, that the classification model correctly classified, wherein the samples described by the automatically generated metadata are samples in the defined neighborhoods.

3. The method of claim 2, wherein the defining the neighborhoods comprises using at least one radius to define a region of the embedding space centered around an incorrectly classified sample, wherein the region defines a neighborhood of the neighborhoods, and wherein any samples within the region are samples within that neighborhood.

4. The method of claim 1, further comprising constructing, using the automatically generated metadata, knowledge graphs that inform the identified attributes of the one or more correctly classified samples of the collection of samples and the one or more incorrectly classified samples of the collection of samples.

5. The method of claim 4, wherein the automatically generating the metadata comprises initially generating metadata for each neighborhood of the neighborhoods, wherein the constructing the knowledge graphs comprises constructing a respective knowledge graph for each neighborhood of the neighborhoods based on the metadata generated for that neighborhood, wherein the method further comprises combining attributes informed by at least some of the constructed knowledge graphs to construct an aggregate knowledge graph, and wherein the generating the queries generates at least one query of the generated queries from the aggregate knowledge graph.

6. The method of claim 1, wherein:
the collection of samples comprises at least one selected from the group consisting of: images and text; and
the automatically generated metadata comprises at least one selected from the group consisting of: (i) caption information of the images and (ii) object, subject, and relationship information of the text.

7. The method of claim 1, wherein the collection of samples comprises images, wherein at least some of the identified attributes comprise an object depicted in at least some of the images, wherein the automatically generated metadata comprises visibility flags indicating whether the object is visible in the images, and wherein the generating the queries uses the visibility flags in determining whether to tailor at least one query to include or omit results in which the object is visible.

8. The method of claim 1, wherein the generated queries are implemented as crawl paths for crawling remote resources to retrieve the additional training data.

9. The method of claim 1, wherein at least some of the generated queries are multimodal, in which a multimodal query queries for both text and image results.

10. The method of claim 1, further comprising:
ranking the generated queries into a ranked list of queries; and
selecting, from the ranked list of queries, a query to issue, wherein the selecting applies a budget comprising one or more constraints on resources to execute the query, the resources comprising at least one selected from the group consisting of: computing cost, memory, time, and electrical power.

11. The method of claim 1, further comprising:
issuing at least one query of the generated queries;
retrieving, in response to the issuing, additional samples on which to train the classification model; and
retraining the classification model using the additional samples.

12. The method of claim 11, further comprising, based on the retraining:
iterating one or more times: (i) the automatically generating metadata, (ii) the identifying attributes, (iii) the generating queries, (iv) the issuing at least one query, (v) the retrieving additional samples, and (vi) the retraining the classification model; and
checking whether to halt the iterating by testing stability of the classification model and determining whether a threshold has been reached to avoid overfitting the classification model.

13. A computer system comprising:
a memory; and
a processor in communication with the memory, wherein the computer system is configured to perform a method comprising:
automatically generating metadata describing samples, of an initial dataset, in neighborhoods of an embedding space in which the samples are embedded, the samples described by the automatically generated metadata being classified by a classification model, and including both correctly classified samples in the neighborhoods and incorrectly classified samples in the neighborhoods;
identifying attributes of one or more correctly classified samples of the collection of samples and one or more incorrectly classified samples of the collection of samples; and
generating queries based on the identified attributes, the queries tailored, based on the attributes, to retrieve additional training data for training the classification model to more accurately classify samples and avoid incorrect sample classification.

14. The computer system of claim 13, wherein the method further comprises:
obtaining an embedding of a collection of samples, of the initial dataset, in the embedding space, the embedding presenting a respective classification of each sample of the collection of samples by the classification model; and defining the neighborhoods of the embedding space, wherein each neighborhood of the neighborhoods comprises a respective at least one incorrectly classified sample of the collection of samples, embedded in the embedding space, that the classification model incorrectly classified and a respective at least one correctly classified sample of the collection of samples, embedded in the embedding space, that the classification model correctly classified, wherein the samples described by the automatically generated metadata are samples in the defined neighborhoods.

15. The computer system of claim 13, wherein the method further comprises constructing, using the automatically generated metadata, knowledge graphs that inform the identified attributes of the one or more correctly classified samples of the collection of samples and the one or more incorrectly classified samples of the collection of samples.

16. The computer system of claim 15, wherein the automatically generating the metadata comprises initially generating metadata for each neighborhood of the neighborhoods, wherein the constructing the knowledge graphs comprises constructing a respective knowledge graph for each neighborhood of the neighborhoods based on the metadata generated for that neighborhood, wherein the method further comprises combining attributes informed by at least some of the constructed knowledge graphs to construct an aggregate knowledge graph, and wherein the generating the queries generates at least one query of the generated queries from the aggregate knowledge graph.

17. The computer system of claim 13, wherein the collection of samples comprises images, wherein at least some of the identified attributes comprise an object depicted in at least some of the images, wherein the automatically generated metadata comprises visibility flags indicating whether the object is visible in the images, and wherein the generating the queries uses the visibility flags in determining whether to tailor at least one query to include or omit results in which the object is visible.

18. The computer system of claim 13, wherein at least some of the generated queries are multimodal, in which a multimodal query queries for both text and image results.

19. The computer system of claim 13, wherein the method further comprises:

ranking the generated queries into a ranked list of queries; and selecting, from the ranked list of queries, a query to issue, wherein the selecting applies a budget comprising one or more constraints on resources to execute the query, the resources comprising at least one selected from the group consisting of: computing cost, memory, time, and electrical power.

20. A computer program product comprising:
a computer readable storage medium readable by a processing circuit and storing instructions for execution by the processing circuit for performing a method comprising:

automatically generating metadata describing samples, of an initial dataset, in neighborhoods of an embedding space in which the samples are embedded, the samples described by the automatically generated metadata being classified by a classification model, and including both correctly classified samples in the neighborhoods and incorrectly classified samples in the neighborhoods;

identifying attributes of one or more correctly classified samples of the collection of samples and one or more incorrectly classified samples of the collection of samples; and generating queries based on the identified attributes, the queries tailored, based on the attributes, to retrieve additional training data for training the classification model to more accurately classify samples and avoid incorrect sample classification.

21. The computer program product of claim 20, wherein the method further comprises:

obtaining an embedding of a collection of samples, of the initial dataset, in the embedding space, the embedding presenting a respective classification of each sample of the collection of samples by the classification model; and defining the neighborhoods of the embedding space, wherein each neighborhood of the neighborhoods comprises a respective at least one incorrectly classified sample of the collection of samples, embedded in the embedding space, that the classification model incorrectly classified and a respective at least one correctly classified sample of the collection of samples, embedded in the embedding space, that the classification model correctly classified, wherein the samples described by the automatically generated metadata are samples in the defined neighborhoods.

22. The computer program product of claim 20, wherein the method further comprises constructing, using the automatically generated metadata, knowledge graphs that inform the identified attributes of the one or more correctly classified samples of the collection of samples and the one or more incorrectly classified samples of the collection of samples.

23. The computer program product of claim 22, wherein the automatically generating the metadata comprises initially generating metadata for each neighborhood of the neighborhoods, wherein the constructing the knowledge graphs comprises constructing a respective knowledge graph for each neighborhood of the neighborhoods based on the metadata generated for that neighborhood, wherein the method further comprises combining attributes informed by at least some of the constructed knowledge graphs to construct an aggregate knowledge graph, and wherein the generating the queries generates at least one query of the generated queries from the aggregate knowledge graph.

24. The computer program product of claim 20, wherein the collection of samples comprises images, wherein at least some of the identified attributes comprise an object depicted in at least some of the images, wherein the automatically generated metadata comprises visibility flags indicating whether the object is visible in the images, and wherein the generating the queries uses the visibility flags in determining whether to tailor at least one query to include or omit results in which the object is visible.

25. The computer program product of claim 20, wherein at least some of the generated queries are multimodal, in which a multimodal query queries for both text and image results.

* * * * *